US006237377B1

(12) United States Patent
Vasquez, Sr.

(10) Patent No.: US 6,237,377 B1
(45) Date of Patent: May 29, 2001

(54) TRUCK/CAMPER SECURITY BAR

(76) Inventor: Robert Joseph Vasquez, Sr., 2838 Santa Rita Dr., Gr. Prairie, TX (US) 75052-5219

(*) Notice: Subject to any disclaimer, the term of this patent is extended or adjusted under 35 U.S.C. 154(b) by 0 days.

(21) Appl. No.: 09/318,475

(22) Filed: May 25, 1999

(51) Int. Cl.[7] .................................................... B60R 25/00
(52) U.S. Cl. .................................. 70/237; 70/259; 70/14; 292/167; 292/288
(58) Field of Search .................................. 70/14, 94, 237, 70/238, 259, 158, 163–167; 292/DIG. 43, 65, 288, 289

(56) References Cited

U.S. PATENT DOCUMENTS

| | | | | |
|---|---|---|---|---|
| 3,117,689 | * | 1/1964 | Dedic | 292/167 X |
| 3,368,785 | * | 2/1968 | Weiler | 292/167 X |
| 3,719,382 | * | 3/1973 | Palm | 292/167 X |
| 4,103,959 | * | 8/1978 | Whiting et al. | 292/167 X |
| 4,526,021 | * | 7/1985 | Princell | 70/259 X |
| 4,562,708 | * | 1/1986 | Gros | 70/94 |
| 4,819,461 | * | 4/1989 | Pearson | 70/237 X |
| 4,846,513 | * | 7/1989 | Mathis, II | 292/288 X |
| 5,154,459 | * | 10/1992 | Cochran | 292/288 X |
| 5,165,743 | * | 11/1992 | Zock | 292/DIG. 43 X |
| 5,267,688 | * | 12/1993 | Benefield | 70/94 X |
| 5,343,722 | * | 9/1994 | Richardson | 70/259 |
| 5,358,293 | * | 10/1994 | Bradley, Jr. et al. | 292/DIG. 65 X |
| 5,983,684 | * | 11/1999 | Boisvert | 70/14 X |

* cited by examiner

*Primary Examiner*—Suzanne Dino Barrett

(57) ABSTRACT

The lower section of the L-shaped truck/camper security bar inserts into an existing load-leveling type trailer hitch and can be locked into place with an existing trailer hitch lock. The upper section extends vertically along the rear of the vehicle to block the pulling down action that would open the tailgate and to block the lifting up action that would open the camper top rear window.

1 Claim, 1 Drawing Sheet

TRUCK/CAMPER SECURITY BAR

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

This invention relates generally to anti-theft tailgate devices and to anti-theft camper top devices, and more particularly to a locking theft-deterrent yet releasable steel bar that prohibits the opening of the tailgate and the rear lift window of the camper top.

Theft of motor vehicles and theft of motor vehicle parts continue to rise in the United States. With the turn of the century we may see even more thefts of the same as well as thefts of items stored in enclosed vehicles such as pickup trucks with camper tops.

This invention is particularly applicable to pickup trucks with camper tops. The invention function is to deter thefts of tailgates, camper tops, and items stored in enclosed vehicle cargo beds.

Camper tops today are built with a rear lift window. These rear lift windows generally have a metal rod attached to each side of a centered twist handle. Each rod extends to its side of the camper top hindering the opening action of the rear lift window when the twist handle is in the lock position. The rods move away from the sides of the camper when the handle is turned to the unlocked position, which enables the rear window to lift open. However, camper top manufacturers that make the rear lift window design use rods of metal that have just enough flexibility that when the locked twist handle on the rear window is pulled hard enough, as if to open the window, the rods do not have the strength to prevent the opening of the rear lift window of the camper top. Thus, items stored inside the camper and pickup truck cargo bed are no longer secured. Furthermore, once inside the camper, the camper top can be unbolted and removed. The locking mechanism in the handle, elaborate or not, becomes insignificant because the rods will not hold the lift window in the closed position.

This invention pertains to an unbendable L-shaped steel bar that rests and locks into a load-leveling type trailer hitch. When the L-shaped bar is inserted into the trailer hitch, the vertical upper section blocks the pulling down of the tailgate and the lifting up of the rear window of the camper top.

A tailgate lock described as the tailgate release handle security device in the patent, U. S. Pat. 5,303,971, issued to Roger L. Johnsen et al on Apr. 19, 1994, can only prevent the theft of the tailgate and not deter theft of a camper top and items stored in the camper top or truck cargo bed. The camper top rear lift window remains unsecured, for the reasons stated henceforth, as it is independent of the tailgate and its locking mechanism. Hence, the camper top and items stored in the camper top and cargo bed remain unsecured also.

The following patents that secure the camper to the truck cargo bed, body, or chaise frame were reviewed:

| U.S. Pat. No. | Date | Inventor |
|---|---|---|
| 3,368,785 | 02-13-68 | Weiler |
| 3,719,382 | 03-06-73 | Palm |
| 3,817,460 | 06-04-74 | Norrish |
| 4,103,959 | 08-01-78 | Whiting et al |
| 5,277,471 | 01-11-94 | Thibault |

Using any of the aforementioned patents that securely hold the camper in place in the truck cargo bed will not deter the entrance into the camper or cargo bed of the truck where items are stored. Therefore, the function of the invention is to provide an unbendable steel bar that would prohibit the pulling open of the tailgate and the camper top rear window. Furthermore, by doing so, the invention would prevent easy access to the inside of the vehicle and theft of items stored there. Uniquely, the L-shaped steel bar would readily fit and lock into an existing load-leveling trailer hitch.

BRIEF SUMMARY OF THE INVENTION

As seen in the background of the invention, there are products that can lock a pickup truck tailgate, and lock down a camper top to the pickup truck bed. Rear entry camper top windows have locking handles but inferior devices to hold the windows closed under a manual pulling force. What seems to be lacking in today's market is a device to prohibit the pulling open of tailgates and rear entry camper top windows.

The object of the invention is to provide an unbendable steel bar that would prohibit the pulling open of the pickup truck tailgate and the rear-entry camper top window, preventing easy access to the inside of the vehicle and theft of items stored there.

In using the invention, the user would simply insert the steel bar into an existing load-leveling trailer hitch and lock the device into place using an existing trailer hitch lock. When locked into position, the steel bar extends vertically along, but not touching, the tailgate of the vehicle and the camper rear window.

DETAILED DESCRIPTION OF THE INVENTION

Figure 3:
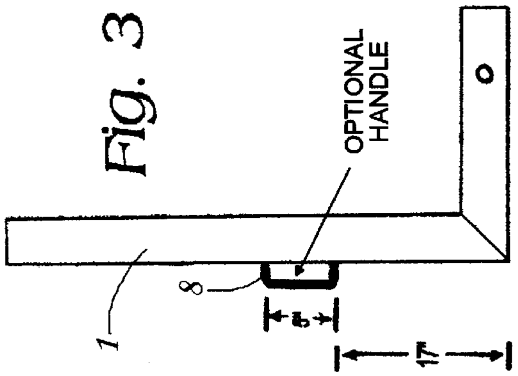
FIG. 3 is an elevated side view of the invention with an attached optional handle.
Figure 2:
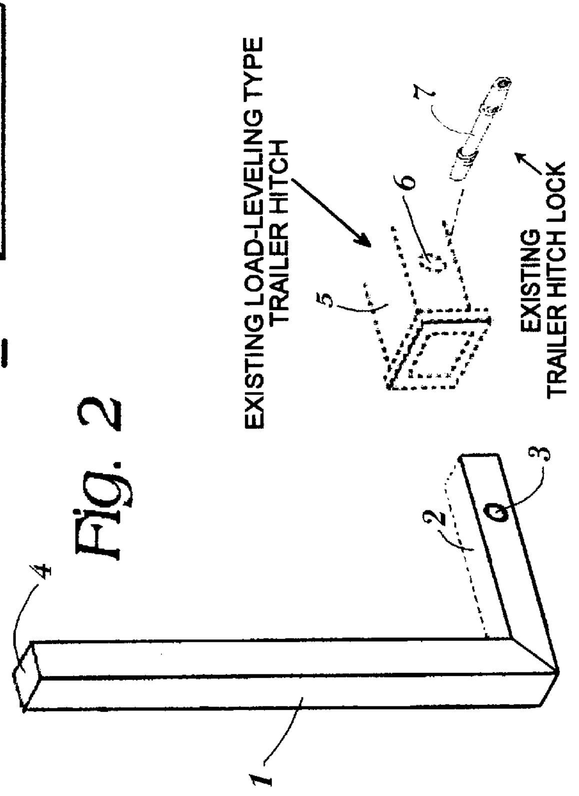
FIG. 2 is a perspective view of the invention and an existing load-leveling trailer hitch with an existing trailer hitch lock.
Figure 1:
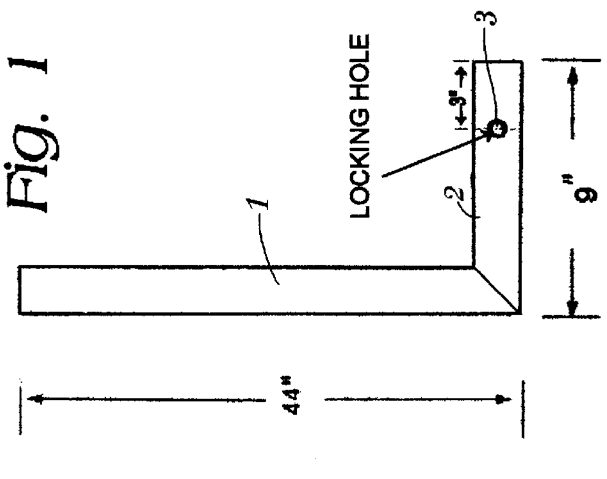
FIG. 1 is an elevated side view of the invention, "The Truck/Camper Security Bar".

The invention, "The Truck/Camper Security Bar", illustrated in FIGS. 1–3, is an L-shaped steel bar, the upper section 1 (FIG. 1) of which would be approximately 44 inches long and the lower section 2 (FIG. 1) approximately nine inches long. The dimensions need not be exact but will accommodate most pickup trucks. The entire bar would be manufactured using 2×2 hollow iron/steel tubing. The 44-inch upper section 1 would have one end cut on the diagonal. The nine-inch lower section 2 would also have one end cut on the diagonal. The diagonal-cut end of the upper section would be welded to the diagonal-cut end of the lower section to form the L shape. The diagonal-cut ends will produce the best weld. However, one may attach the 44-inch upper section by a weld to the square end of a seven-inch lower section to form an L shape without incorporating the diagonal cut.

The locking hole 3 (FIGS. 1 and 2) is put three inches from the end of the lower section 2 (FIGS. 1 and 2), and has a diameter of three-fourths of an inch. It is made by horizontally drilling a pair of holes through opposite sides of the lower section 2 (FIG. 2) so that each hole lines up with each locking hole 6 (FIG. 2) in an existing trailer hitch 5 (FIG. 2).

The lower section 2 of the bar would be inserted into the female end of an existing load-leveling trailer hitch 5 as illustrated in FIG. 2. The locking hole 3 (FIG. 2) would allow the bar to be locked into place using an existing trailer hitch lock 7 (FIG. 2). Once locked into place, the bar would extend upward and block the pickup truck tailgate and the rear-entry camper top window. Thus, it would prevent the theft of the tailgate, the camper shell, and items stored inside the camper top or pickup truck bed by not allowing the tailgate and camper window to be opened.

The top of the upper section 1 (FIG. 2) is capped with a steel plug 4 (FIG. 2) to prevent rainwater from entering the shaft while the invention is in use.

An incorporated five-inch handle 8, illustrated in FIG. 3, mounted approximately 17" from the bottom of the upper section 1 of the bar would allow the bar to be carried without difficulty and allow the bar to be positioned easily into the exiting trailer hitch 5 (FIG. 2).

What is claimed is:

1. A vehicle tailgate security bar for a vehicle with a rear opening comprising:

a lower section bar and an upper section bar, wherein an end of said upper section bar is welded at a right angle to an end of the lower section bar;

wherein said lower section bar and said upper section bar are fabricated from two-inch square hollow metal bars;

wherein said lower section bar includes a pair of locking holes drilled through opposite sides of the lower section bar;

wherein said lower section bar is inserted into a trailer hitch so that the upper section bar extends vertically at the rear of the vehicle, so that the rear opening cannot be opened;

wherein a trailer hitch lock can be inserted into the pair of locking holes to prevent the security bar from being removed.

* * * * *